(12) United States Patent
Marzocca et al.

(10) Patent No.: US 9,511,655 B1
(45) Date of Patent: Dec. 6, 2016

(54) URBANDGO: A SUSTAINABLE URBAN MOBILITY SYSTEM

(75) Inventors: Piergiovani Marzocca, Potsdam, NY (US); Giorgio Gavitaghi, Verbania (IT)

(73) Assignee: CLARKSON UNIVERSITY, Potsdam, NY (US)

(*) Notice: Subject to any disclaimer, the term of this patent is extended or adjusted under 35 U.S.C. 154(b) by 101 days.

(21) Appl. No.: 13/567,807

(22) Filed: Aug. 6, 2012

Related U.S. Application Data

(60) Provisional application No. 61/515,556, filed on Aug. 5, 2011.

(51) Int. Cl.
| | |
|---|---|
| B60K 5/00 | (2006.01) |
| B60K 1/00 | (2006.01) |
| B60L 11/18 | (2006.01) |
| H02J 7/00 | (2006.01) |
| H02J 7/34 | (2006.01) |

(52) U.S. Cl.
CPC .............. *B60K 1/00* (2013.01); *B60L 11/1809* (2013.01); *H02J 7/0052* (2013.01); *H02J 7/0054* (2013.01); *H02J 7/0068* (2013.01); *H02J 7/34* (2013.01)

(58) Field of Classification Search
CPC ..................................................... B60K 5/00
USPC .......... 701/29, 5, 500; 180/65.1–65.31, 54.1, 180/165, 2.1
See application file for complete search history.

(56) References Cited

U.S. PATENT DOCUMENTS

| | | | | |
|---|---|---|---|---|
| 6,557,922 | B1* | 5/2003 | Hommel | 296/107.17 |
| 7,261,174 | B2* | 8/2007 | Yamamoto | B62J 7/04 |
| | | | | 180/53.8 |
| 2007/0170748 | A1* | 7/2007 | Wolf | 296/108 |
| 2010/0280700 | A1* | 11/2010 | Morgal et al. | 701/29 |

\* cited by examiner

*Primary Examiner* — John Walters
*Assistant Examiner* — James Triggs
(74) *Attorney, Agent, or Firm* — Bond Schoeneck & King, PLLC; Blaine Bettinger; George McGuire

(57) ABSTRACT

Specific elements of the Urb&GO ecosystem include a battery electric vehicle (BEV) that is convertible between a driveable mode and a stowable mode where the height of the roof area of the vehicle is lowered when the vehicle is stowed. The stowable mode reduces the volume of the BEV allowing for the storage of more vehicles per cubic feet of storage or parking space. The infrastructure for the BEV includes various configurations for charging and storage facilities. The charging facilities may include wind turbines; solar polar of other renewable power. The proposed Urb&GO concept reduces traffic and congestion and eliminates exhaust fumes reducing greenhouse gas emissions. The "Park & Ride" idea can be used to allow people to use Urb&GO Vehicles to commute to the city. Customer and public ownership and leasing study options are possible with this concept.

22 Claims, 18 Drawing Sheets

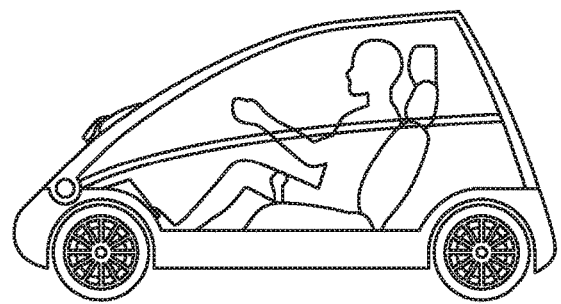
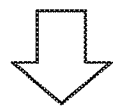
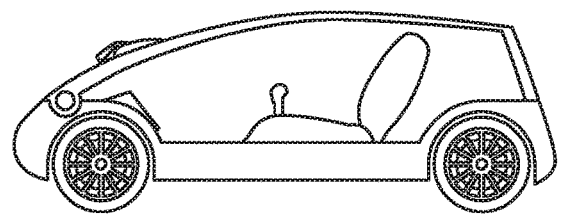
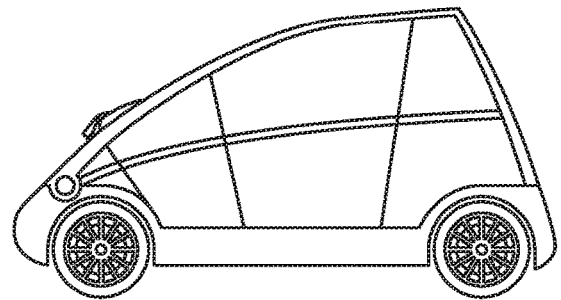
FIGURE 6

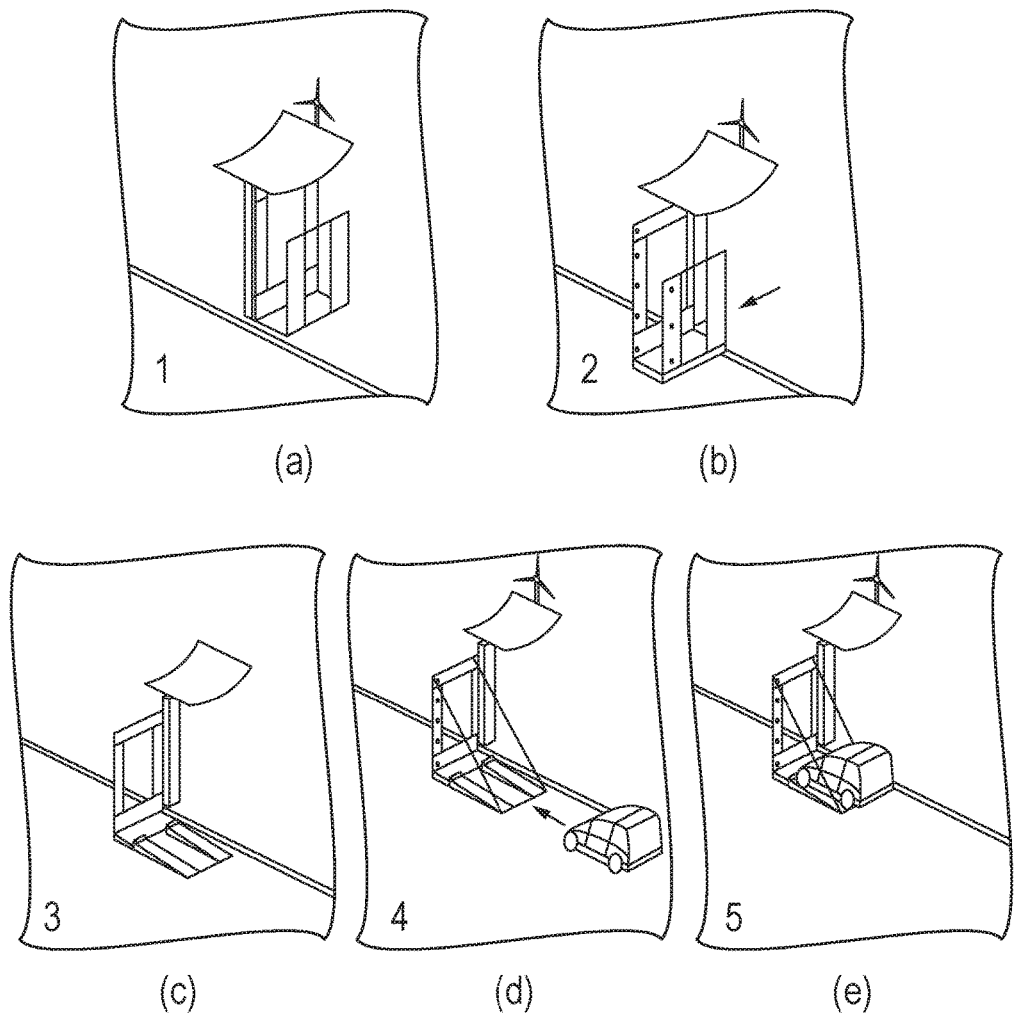
FIGURE 10(a) - (e)

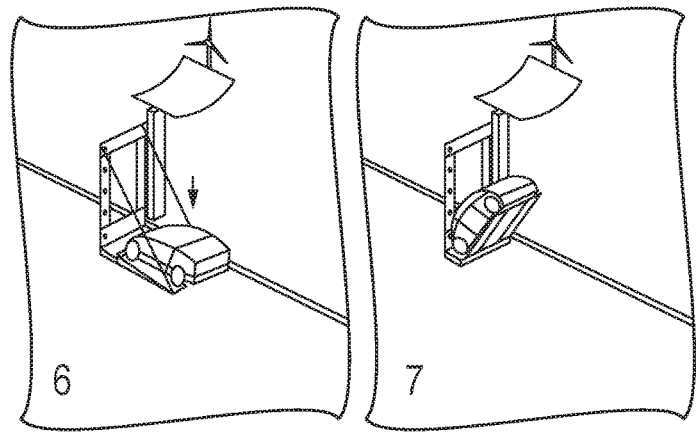
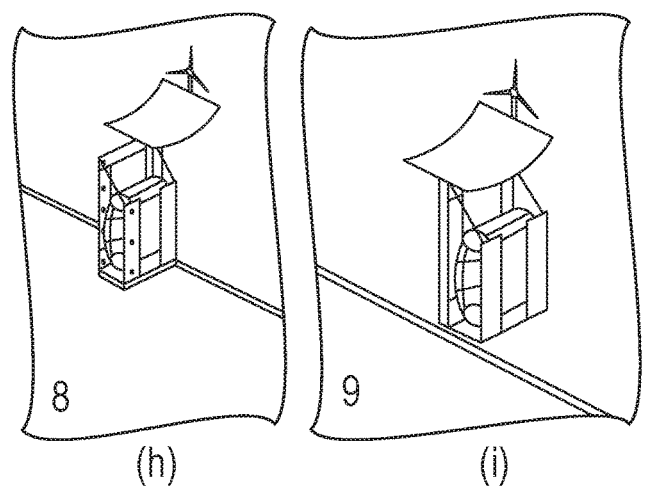
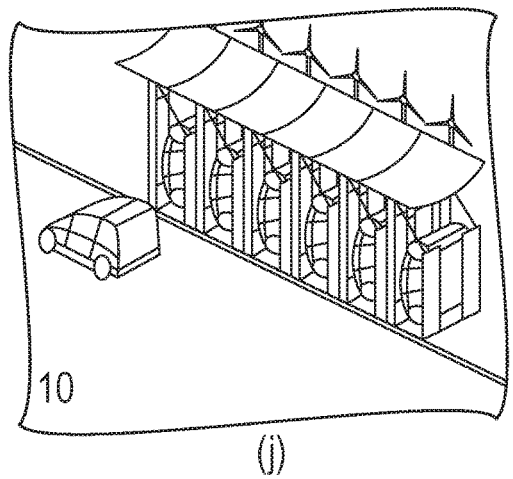
FIGURE 10(f) - (j)

STACKER CRANE SYSTEM

CAR-POD CONTAINER SYSTEM

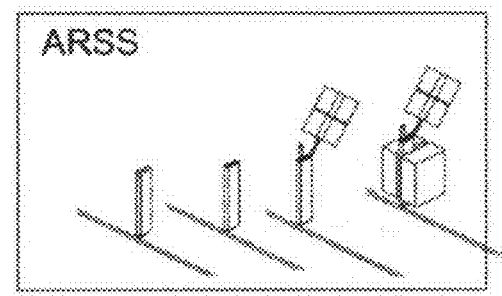
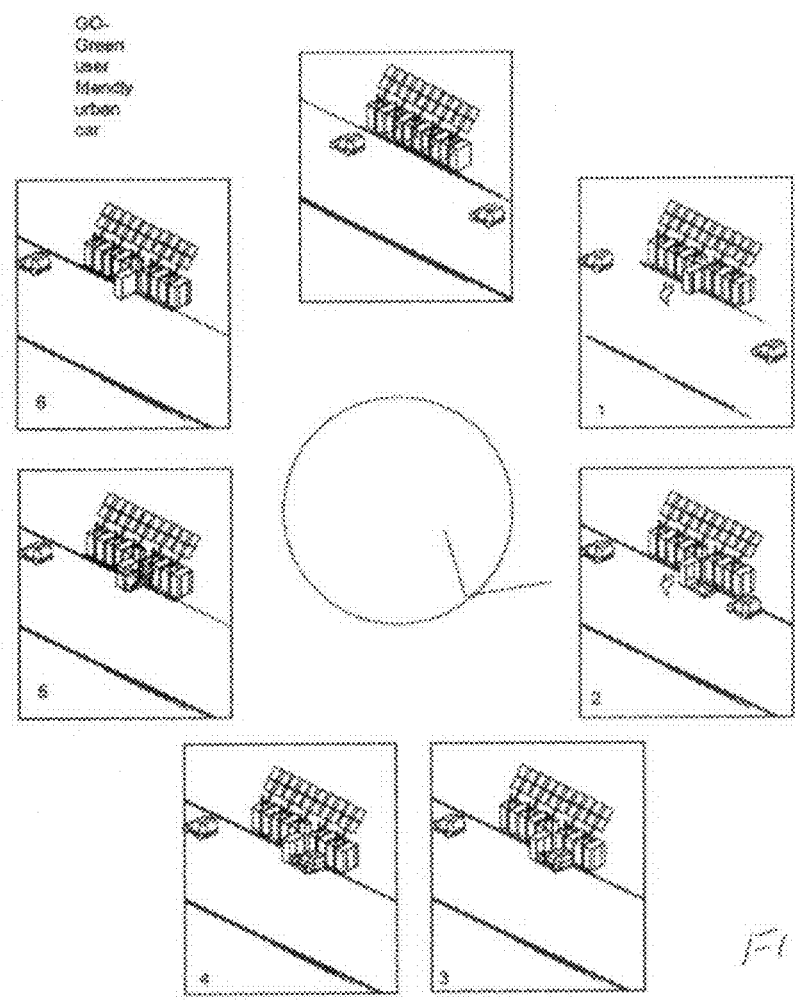
FIGURE 17

| Item | Feature | Conventional Car | urb & GO | Benefit |
|---|---|---|---|---|
| ENERGY | | | | |
| Gas compsumption (EPA data) | 1 car/year (12500 ml) 58.1 gallons (53/g)<br>100,000 car/year  58 100000 gallons | 581 gallons<br>58.1 M gallons | - <br> - | Personal savings 581 gallons<br>Social savings 58.1 M gallons |
| ENVIRONMENTAL | | | | |
| Polluting gases car / year (EPA data) | Hydrocarbon 77.1 pd | 100 k cars 7.71 Mpd | - | Eliminate emissions |
| | Carbon Monoxide 575 pd | 100 k cars 57.5 Mpd | - | |
| | Oxide of Nitrogen 38.2 pd | 100 k cars 3.82 Mpd | - | |
| | Carbon dioxide 11450 pd | | - | |
| Parking area | | | | |
| House parking | 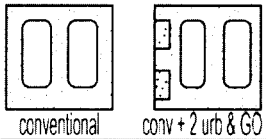 conventional    conv + 2 urb & GO | 1 car = 150 sqft<br>2 cars = 300 sqft | 1 car = 16 sqft<br>2 cars = 32 sqft | 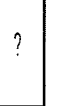 ?  Area saved 134 sqft<br>1 conv. car   2 urb & GO |
| Street parking | 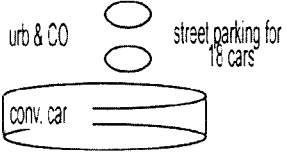 urb & CO    street parking for 18 cars<br>conv. car | 1980 sqft | 28.8 sqft | ?  Area saved 1951.2 sqft<br>1 conv. car   2 urb & GO |
| Parking area | 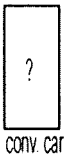 120 cars<br>1 conventional<br>2 urb & GO | parking area<br>30520 sqft | parking area<br>3120 sqft | ?  Area saved 27400 sqft<br>1 conv. car   2 urb & GO |
| Major parking | 4800 cars urb & GO Stacker Parking 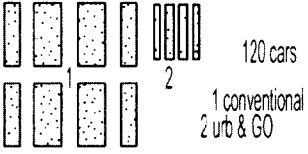 | parking area<br>1.2 M sqft | parking area<br>13600 sqft | ?  Area saved 1.186 M sqft<br>1 conv. car   2 urb & GO |
| ECONOMIC | | | | |
| Fuel | 1 car/year (12500 ml) 681 gallons (63/g)<br>100,000 car/year   58100000 | 174.3 M $/year | 1743 $/year | Personal savings 1743 $<br>Social savings 174.3 M$ |
| Vehicle | cost: 1- Conventional car 20,000 $<br>2- Urb & Go 3,000 $ | 100 K cars 1.7 B$ | 1 car 17.000 $ | Personal savings 17.000 $<br>Social savings 1.7 B$ |
| Maintenance | urb & GO Number of components 20% of conventional car | 100% | 20% | 80% Cost savings |
| Manufacturing | 1 weight | 1500 Kg | 300 Kg | Cost and Material savings |
| | 2 components | 100% | 20% | Cost and complexity savings |
| | 3 production time | 100% | 20% | Cost and time savings |
| | 4 tooling | 100% | 10% | Cost and tooling savings |
| | 5 factory area | 100% | 10% | Cost and area savings |
| | 6 labor cost % | 30% | 8% | Labor cost savings |
| | urb & GO manufacturing costs competitive with low cost labor countries<br>Possibility to create jobs in New York State areas for local and exterioir market | | | |
| GENERAL | | | | |
| Safety | No gas utilization = no fire | | | |
| Theft | Utilization only with credit card type chip ID = lower theft possibilities | | | |

FIG. 20

URBANDGO: A SUSTAINABLE URBAN MOBILITY SYSTEM

CROSS REFERENCE

This application is related to Provisional Patent Application 61/515,556 filed on Aug. 5, 2011 and hereby incorporated herein by reference.

FIELD OF INVENTION

This disclosure describes a sustainable urban mobility ecosystem using small electric vehicles and the infrastructure supporting the vehicles.

BACKGROUND

By 2030 sixty percent of the world's population will live in urban areas by and there will be 2 billion cars on the road (Wired 2010). The automobile offers affordable freedom of movement within cities, providing access to all the benefits that cities offer. It plays a crucial role in the US and other world economies, however, now more than ever, it requires radical reinvention (Mitchell 2010). The design space within which auto makers have been working imposes several constraints thus limiting the currently developed products. Internal Combustion Engine (ICE) vehicles have led the way for many years but newly imposed requirements associated with the environment and energy consumption are forcing essential changes.

Car costs have remained relatively constant, in updated dollars, compared to fifty years ago, implying that there has not been any radical technological progress as compared to electronics and computers where costs have dropped by orders of magnitude over the same time period. Furthermore, although most cars are designed for five passengers they are underutilized by a single driver while the cost per driven mile (including fuel, maintenance, and utilization) continues to grow. However, many people prefer the flexibility, freedom and comforts afforded by a personal vehicle over public transportation and are willing to pay the extra associated costs. Staying the course will not provide solutions to the aforementioned problems—an out-of-the-box approach is necessary to face and solve these problems from fresh and multiple points of view.

Rather than looking at the issue from the traditional vehicle side only, as it has been done by car manufacturers, there is a need for a new concept from the point of view of the user, city authorities, urban planners and developers, civil and transportation engineers, power generation utilities, economics, policy makers, and other stakeholders. There is a need for an integrated ecosystem where the vehicle is just one of the components, the others being power-generating systems, parking and storage, recharging and refueling stations, with proper maintenance and the flexibility of a safe utilization. As we enter a new age of sustainable transportation, there are many challenges as well as opportunities ahead.

Over 6.7 billion people reside on Earth, with more than half now living in urban areas. This includes 26 cities with populations exceeding ten million (UN 2010). There are 850 million vehicles, nearly all powered by ICE and energized with petroleum. In the United States, 85 percent of all personal travel today is by automobile. Americans drive three trillion miles a year, on four million miles of roads, consuming 180 billion gallons of fuel each year dispensed from 170,000 service stations. Furthermore, we can expect significant increases in the number of cars being sold, with a sales growth rate of a few percent per year, in emerging markets like China and India. China's vehicle population is projected to surpass that of the United States by about 2030. 18 million barrels of oil are consumed each day driving cars, while 2.7 billion tons of carbon dioxide is emitted each year. Roadway collisions claim 1.2 million lives each year. In dense city centers, average urban speeds today can be well under 10 miles per hour (Mitchell 2010). Urban centers in many states such as New York State face similar problems that most US and global cities have. They can be briefly summarized:

City traffic congestion is at very high levels and is no longer tolerable or sustainable;

Environmental (air and noise) pollution levels are skyrocketing due to ICE technology;

Parking and garage spaces are limited and require a new sustainable infrastructure;

Traditional fuel service stations and associated underground fuel tanks cause soil pollution; and Growing traditional fuel prices, including strong dependency from overseas work and manufacturers, have high social and economic costs to individuals and communities.

However, cities by their very high-density nature require less energy use per capita because they enable greater efficiency by providing people with more choices of goods and services relatively nearby and more options for getting to them. It is estimated that an average of 24.9 miles per person per day are traveled by vehicles in the largest fifty U.S. metropolitan areas with a population of more than one million.

A combination of battery progress and a clear understanding of personal urban mobility needs leads one to the conclude that battery-electric vehicles can meet the needs of urban drivers sufficiently well to provide an alternative to today's ICE vehicles. The first generation of these vehicles will be able to perform well enough to initiate the switch to battery-electric automobiles, and their advantages will increase over time as further technological innovations, together with economies of scale, take effect.

There are several concepts ready to enter the market. For example the Massachusetts Institute of Technology Media Lab City Car concept as illustrated in FIG. 1. The City Car carries maximum 2 passengers and utilizes fully integrated in-wheel electric motors and suspension systems eliminating the need for traditional drive train configurations like engine blocks, gear boxes, and differentials because they are self-contained, digitally controlled, and reconfigurable. The car is powered by one or more lithium-ion battery that can fuel the vehicle up to 200 miles with no emissions. The car is currently under test-drive and expected to be available in the market by late 2012. This car is intended to provide trips back home after or before getting in public transport hubs like airports, train stations and long-route bus terminals. The wheel robot provides all wheel power and steering capable of 360 degrees of movement, thus allowing for Omni-directional movement. The vehicle can maneuver in tight urban spaces and be parked by sideways translation.

The GM EN-V is a two-seat electric vehicle that incorporates the dynamic stabilization technology of the Segway as illustrated in FIG. 2. The car, which has a top speed of about 25 mph, is powered by a lithium-ion battery that can be recharged by a standard wall outlet, and can go roughly 25 miles between charges. Ultimately the GM EN-V will have autonomous and features collision avoidance systems that can detect pedestrians as well as other vehicles, and will be remotely retrieved from parking spots, and has a "platooning" feature, which allows it to coordinate with and follow other vehicles when traveling on city roads.

There are several other concepts all centered about the paradigm of urban mobility zero-emission vehicle. However, major problems still remain open. To realize complete electro-mobility a new infrastructure is required and usually includes power distribution stations, which might require a new electric power transmission grid, with associated substations and shorter distribution lines to the specific charging structure. Clearly none of the concepts currently proposed by specialized automotive laboratories has considered the vehicle and the refueling problems as well as the urban environment all at once.

SUMMARY

A sustainable urban mobility ecosystem is described in this application. The proposed concept reduces the costs associated with energy expended to power city vehicles while significantly increasing the efficiency of renewable energy resources through the use of a network of relatively low-cost urban mobility systems, Urb&GO, is a revolutionary transportation ecosystem for personal vehicles. The Urb&GO concept includes stowable Battery-Electric Vehicles (BEV) and associated green energy charging station and storage containers, geographically distributed to exploit the availability of renewable energy sources for its operation. The system addresses the problem of carbon emissions, sustainability, transportation, city planning, energy and civil/transportation infrastructure and traffic, all at once. The distributed system has the potential of significantly enhancing the energy efficiency, economics, reliability, security, and overall performance of the urban transportation by:
1. Optimizing the utilization of the available renewable power, and using it at the source, for powering Urb&GO charging stations to recharge a fleet of battery-electric vehicles;
2. Minimizing losses associated with power transmission and removing the need of expensive electrical and transportation infrastructures by placing the green Urb&GO charging stations in strategic locations, some of which could be electrical grid-connected; and
3. Optimizing the use of existing parking facilities by replacing two parking spaces with a container each storing and charging a plurality of battery-electric vehicles.

This system is a best-in-class technology providing flexible, zero-carbon footprint, urban mobility to citizens, which can be deployed very quickly with minimal impact to the community and power grid system. Urb&GO can be deployed and be up and running in a matter of days, instead of the much longer periods necessary for the development of grid-tied plug-in stations. The Urb&GO concept provides the means to avoid performing expensive utility upgrades as the need for transportation through cities grows, keeping the infrastructure and transmission & distribution costs low, thus making it possible to use wind and other renewable resources. In addition to the efficiency gained by using renewable energy, the maximum utilization of renewable energy can be managed and can provide additional power resources to hosting built environment by supplying the excess power to the grid. The proposed Urb&GO concept reduces traffic and congestion and eliminates exhaust fumes reducing greenhouse gas emissions. The "Park & Ride" idea can be used to allow people to use Urb&GO Vehicles to commute to the city. The concept can also be used for supply, distribution and delivery (of products and services) for city residents. Customer and public ownership and leasing study options are possible with this concept. Vehicles can be rented at one location and returned at a different location. Vehicle time-share ownership and operation is also a possible solution. Leveraging the partnership with power generation and storage and automotive industries leaders, the goal of Urb&GO is to systematically investigate the energy management and distribution along with the vehicle concept. By optimizing Urb&GO the potential of generating significant efficiency for the utilization of renewable energy sources can be exploited as to create new economic models for both renewable energy and urban mobility. Large cities across the country are particularly well positioned to demonstrate this technology because of the relative abundance of renewable energy resources, primarily high winds generated in city canyons, coupled with demand for high mobility.

Specific elements of the Urb&GO technology include a BEV that is convertible between a driveable mode and a stowable mode where the height of the roof area of the vehicle is lowered when the vehicle is stowed. The stowable mode reduces the volume of the BEV allowing for the storage of more vehicles per cubic feet of storage or parking space. The battery in the BEV may be easily removable manually or by a battery replacement mechanism with a charging station in order to make the charging time for a vehicle be shortened. The infrastructure for the BEV includes various configurations for charging and storage facilities. The charging facilities may include wind turbines; solar polar of other renewable power. A military application could include small nuclear power generators where security of the power source is available. A fleet of Urb&GO systems can be deployed from an aircraft and each individual (or a plurality) of units can be deployed were the rotor is used in a rotorcraft mode (to propel the container and land the system on the ground) and in a wind turbine mode (once the container reached the ground). A single unit or a plurality of units can be deployed at once.

BRIEF DESCRIPTION OF THE DRAWINGS

The implementation of the system may be understood within the written description of system contained herein taken together with the following drawings, which illustrate only several embodiments of the system, and in which:

FIG. 3-1 illustrates a homologated Urb&GO vehicle in its driving configuration;

FIG. 4-1 illustrates a homologated Urb&GO vehicle in its storage configuration;

FIG. 6 illustrates the two seated vehicle and the four seated vehicle in a driving mode, in a foldable/storage mode; and an illustration of the volume saved between two modes.

FIGS. 10(a-j) illustrate a single parking street system.

FIG. 16 illustrates the usage of vehicle storage station system and an array of single pods;

FIG. 17 illustrates various automobile recharging storage stations the progression of a vehicle entering and leaving a multipod storage and recharging station.

FIG. 20 illustrates the many benefits of the Urb&GO sustainable mobility ecosystem.

DETAILED DESCRIPTION

This disclosure is directed to solving many of the problems already identified regarding the current ICE-based vehicles by creating an integrated urban transportation ecosystem where the vehicle is just one of the main components, the others being: parking and storage; a power generation system; recharging and refueling stations; maintenance and a customer-friendly utilization system. The Urb&GO system is not centered on another small car concept. While maintaining and even enhancing current levels of personal mobility within cities, the Urb&GO ecosystem can reduce the overall energy and materials requirements of mobility systems by eliminating the main cause of economic and environmental problems, fossil fuel dependence from nonrenewable sources. Natural renewable resources, solar and wind power, can be harvested to replace oil as the main fuel component, eliminating air pollution, a consequence of the multitude of ICE vehicles present daily in urban areas. In addition to describing the ecosystems and its components this disclosure discloses methods of using the ecosystem including the support of the battery electric vehicle.

Figure 1:
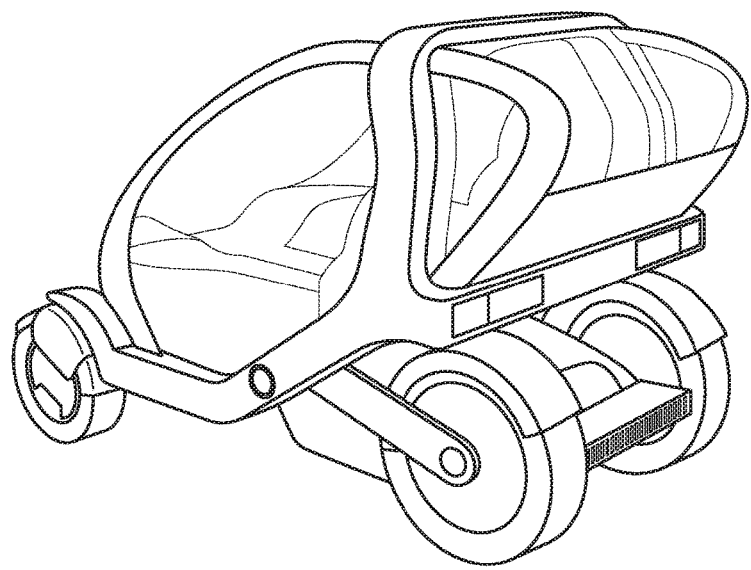
FIG. 1 illustrates the MIT Lab City Car.
Figure 2:
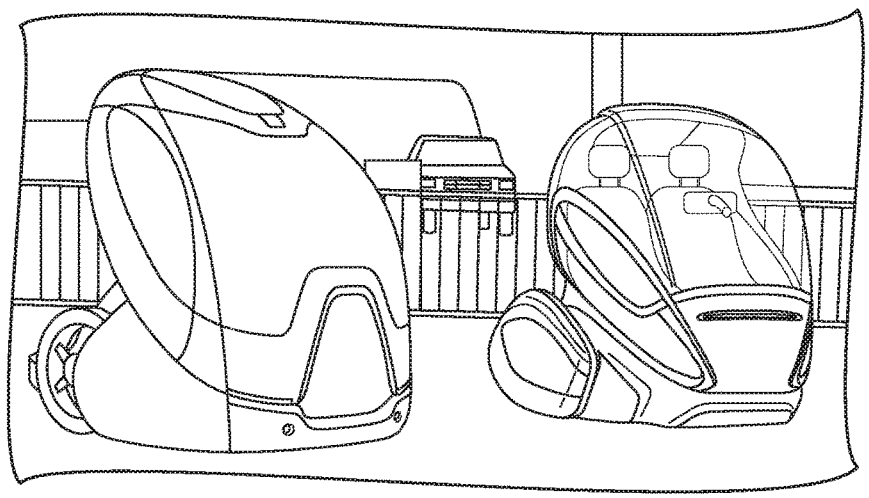
FIG. 2 illustrates the GM EN-v Car
Figure 3:
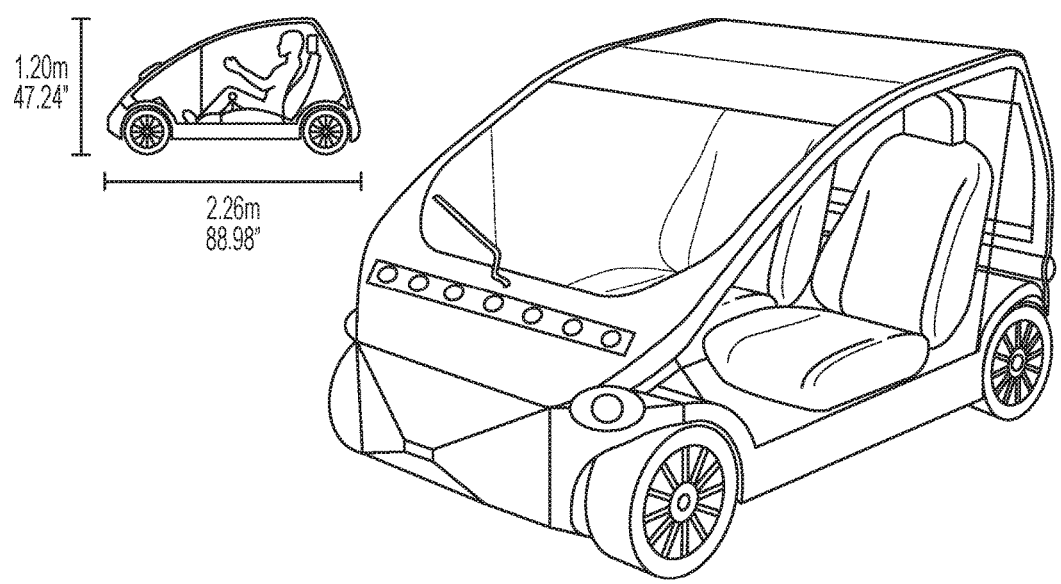
FIG. 3 illustrates a non-homologated Urb&GO vehicle in its driving configuration.
Figure 4:
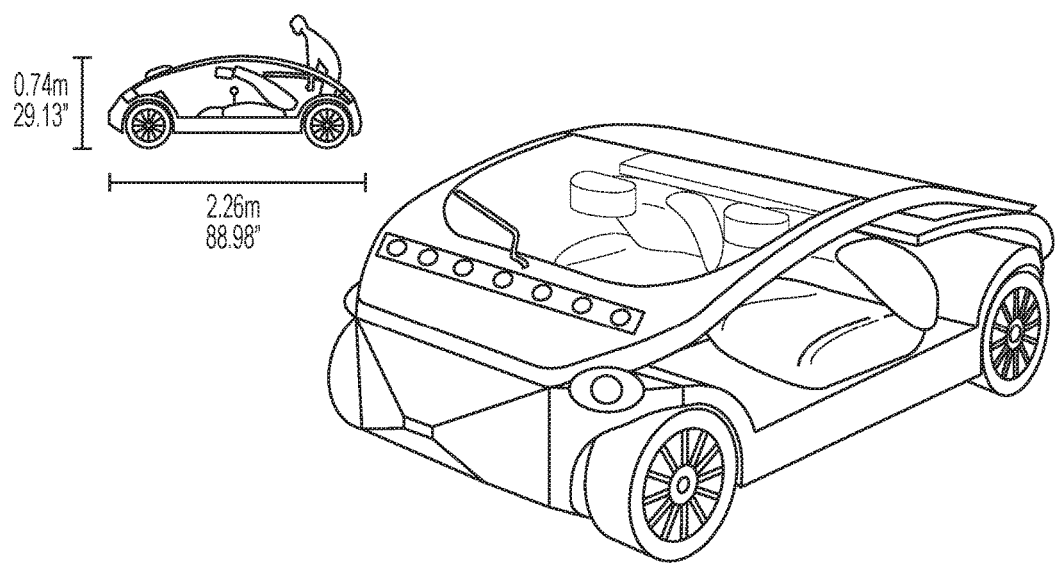
FIG. 4 illustrates a non-homologated Urb&GO vehicle in its storage configuration.
Figures 1, 3:
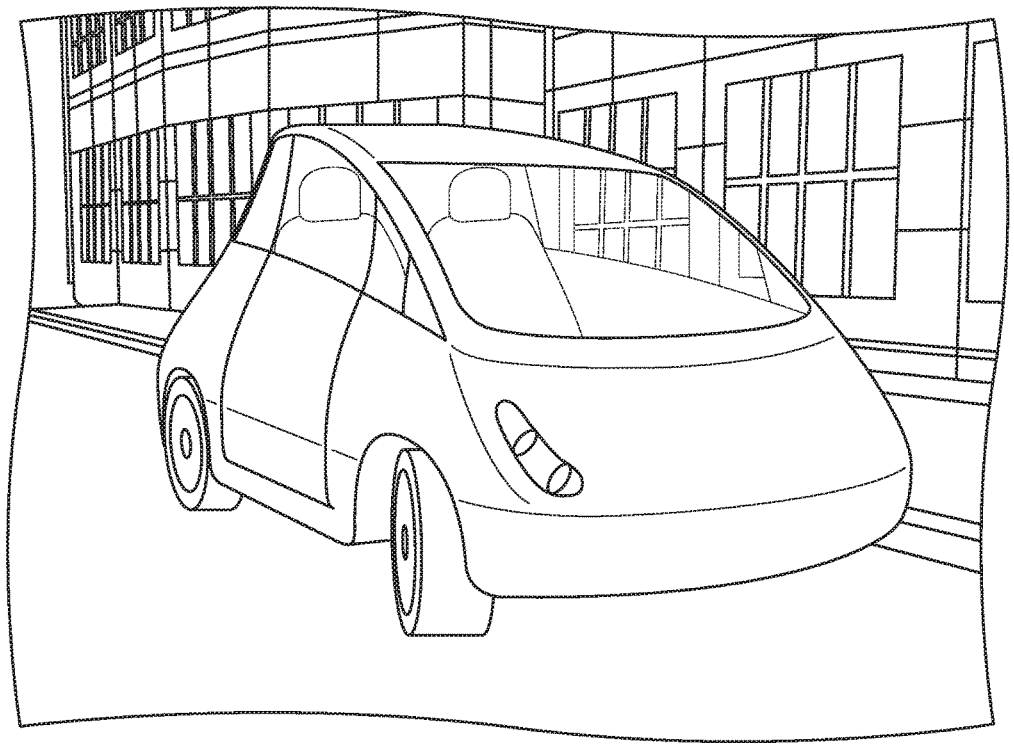
Figures 1, 4:
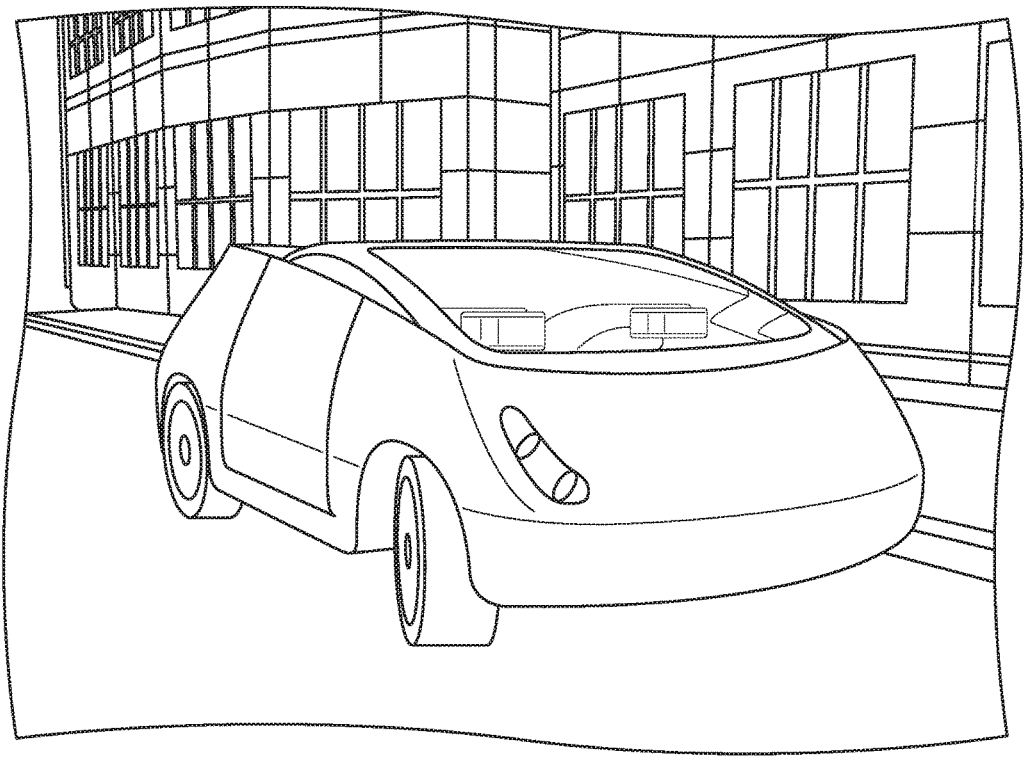
Figure 5:
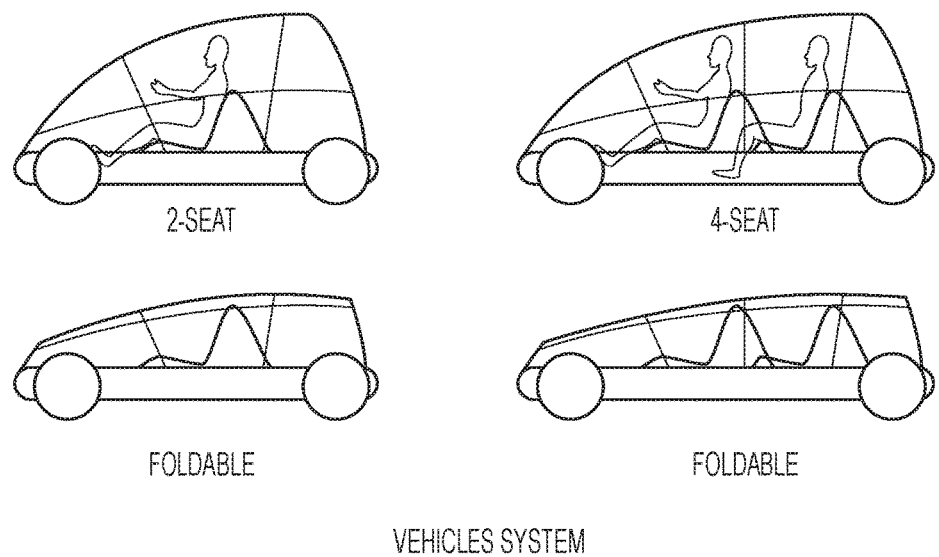
FIG. 5 illustrates a two seated vehicle and a four seated vehicle in a driving mode and a foldable/storage mode.

FIGS. 3 and 4 illustrate an exemplary battery electric vehicle (BEV) in its drivable condition mode and its stowed/charging condition mode. The vehicle is an all-electric vehicle (BEV) designed as a 2 passenger or a 4 passenger vehicle that exists in two forms: a driving condition mode and a stowed/charging condition mode. The driving condition mode while small has the normal roof line height to accommodate passengers as illustrated in FIGS. 3 and 3-1. Exemplary dimensions for the BEV in its driving condition mode 2.26 m (89 in.) long and 1.20 m 47 in,) high. The stowed/charging condition mode as illustrated in FIGS. 4 and 4-1 has the roof line changed to provide a lower roof line in order to be stored in a smaller space. Exemplary dimensions for the BEV in its stowed/charging condition mode are 2.26 m (89 in.) long and 0.74 m (29 in) high. FIGS. 3 and 4 illustrate a non-homologated vehicle and FIGS. 3-1 and 4-1 illustrate a homologated vehicle. Both homologated and non-homologated vehicles may be used in the eco-system. FIG. 5 schematically illustrates the vehicles (2 passengers and 4 passengers) in the driving condition and in the stowed/charging condition mode. The stowed/charging condition mode is accomplished by folding the roof area of the vehicle down to reduce the vehicle height. FIGS. 6 (a)-(c) illustrate the driving condition mode and the stowed condition mode. FIG. 6(a) illustrates the position of a passenger in the driving condition mode. FIG. 6(b) illustrates the stowable condition mode with the lowered roof line. FIG. 6(c) illustrates the amount of space the stowable condition mode saves over the driveable condition mode. The saving of approximately 0.46 m (18 in.) of height provides significant savings for storage or parking for the BEV over a conventional ICE vehicle. As will be illustrated below, the battery within the BEV may be manually removed and replaced or mechanically removed and replaced within a charging station.

Figure 7:
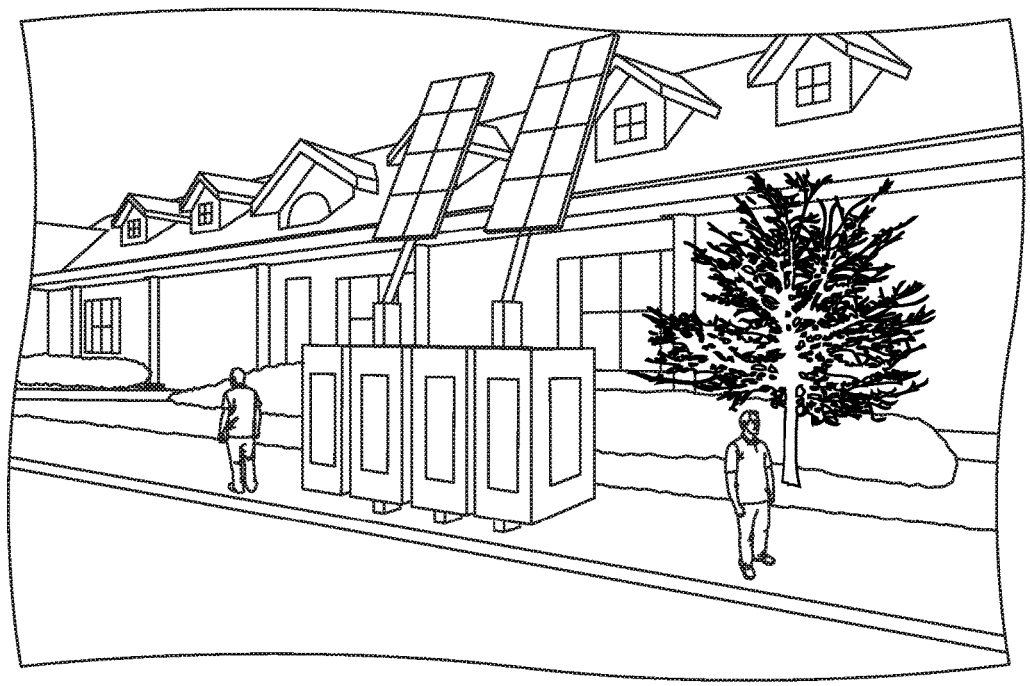
FIG. 7 a combination of single pod containers with solar arrays for daytime operation.
Figure 8:
FIG. 8 illustrates a combination of single pod containers with wind turbine arrays for nighttime operation.
Figure 9:
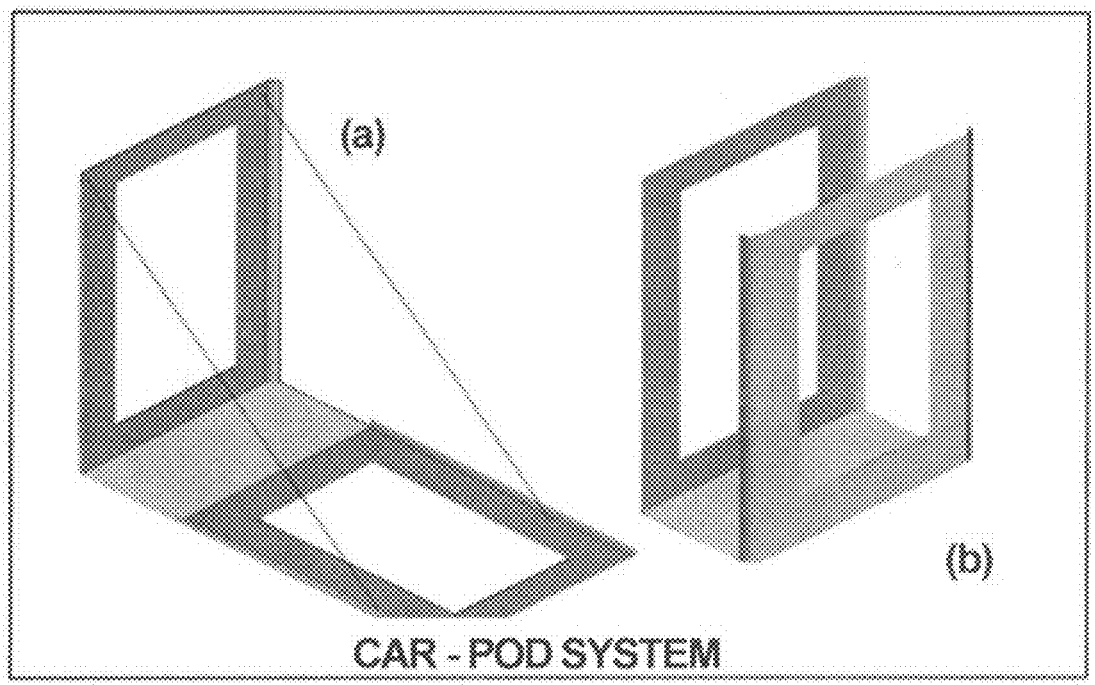
FIG. 9 illustrates a car pod system illustrating one position in a down position to receive a vehicle and a second position illustrating a closed pod.

FIG. 7 illustrates a plurality of single pods for storing the vehicle and the use of a plurality of solar arrays to provide battery charging electricity in the daytime. FIG. 8 illustrates a plurality of wind turbine arrays to provide battery charging electricity when daylight is not available, but wind is available. Another embodiment of such single pods may have both of these sources of electricity. FIG. 9 schematically illustrates a car pod system in an open position for loading a BEV vehicle with the car pod. FIG. 9 also schematically illustrates the closed position of car pod.

Figure 11:
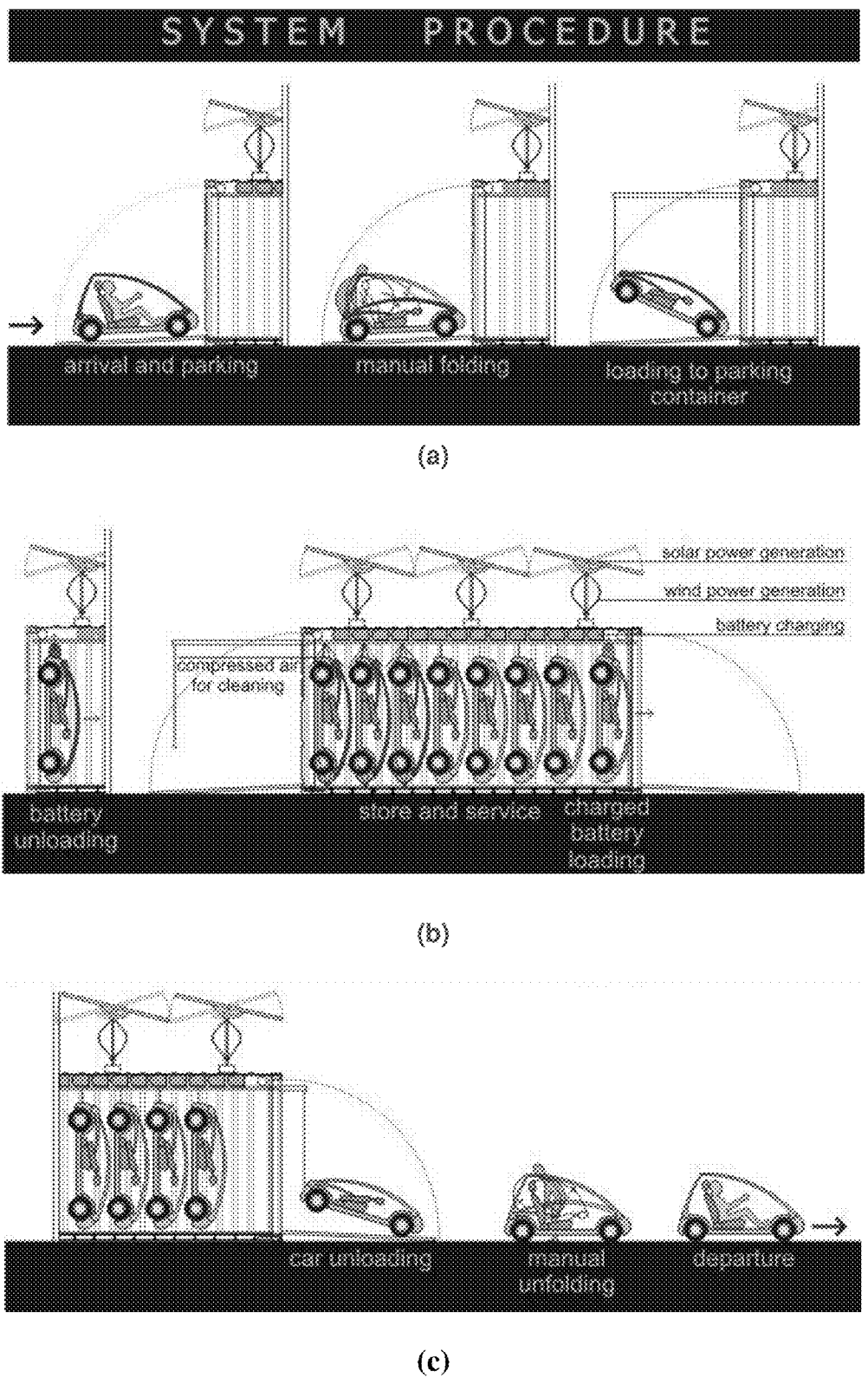
FIG. 11 (a-c) illustrates the storing and charging operation including removal of a vehicle battery installing a charged battery.
Figure 13:
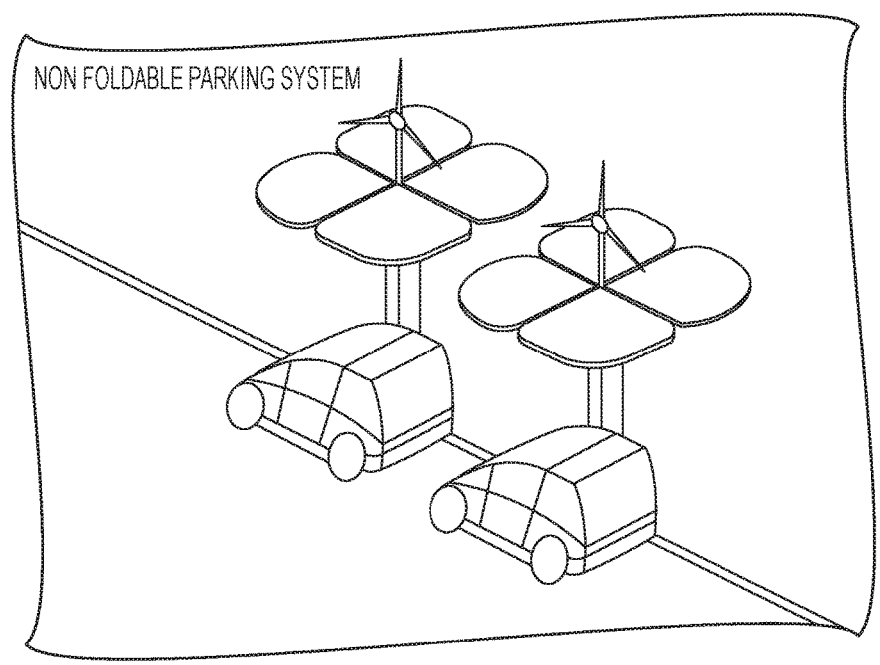
FIG. 13 illustrates a no foldable parking system.

FIGS. 10(1-10) illustrate a one of several parking alternatives in the ecosystem. FIG. 10(1) illustrates a single parking pod in an unoccupied state on one curb of street. FIG. 10(2) illustrates the movement of the single pod onto the street to receive a vehicle. Note that the pod has two vertical elements on side of the pod. FIG. 10(3) illustrates that these two vertical elements have moved to the road surface and are designed to accommodate the wheel tracks of the BEV vehicle. FIG. 10(4) illustrates a BEV vehicle being driven up to the pod toward the wheel tracks. FIG. 10(5) illustrates the BEV vehicle totally on the wheel tracks. Note at this point the vehicle is still in its driveable condition. FIG. 10(6) illustrates the BEV vehicle on the wheel tracks and has been changed from its driveable condition mode to its stowed condition mode. FIG. 10(7) illustrates the wheel tracks are being raised with the vehicle in its stowable condition mode being placed in a vertical position with the BEV vehicle's front supporting the BEV vehicle and being supported by the pod's wheel tracks. FIG. 10(8) illustrates the BEV vehicle in its stowed condition while the pod is still located on the street. FIG. 10(9) illustrates the BEV vehicle in its stowed condition and the pod has been moved onto the sidewalk area. The above has dealt with the parameters of one pod and its stowed vehicle. FIG. 10(10) illustrates a plurality of pods, each one storing one vehicle. As can be seen when comparing FIG. 11(10) and FIG. 13 illustrating a non-foldable parking system, the storage concept using a BEV vehicle that has a driving condition mode and a stowable condition mode as illustrated in FIGS. 11(1-10) are more space efficient that are current vehicles. Note that a Non-foldable parking system illustrated in FIG. 13 illustrates the possible useage of a solar panel electrical source and a wind turbine electrical source for a non-foldable battery electric vehicle.

FIGS. 11(a-c) illustrates the flow of a BEV entering a charging/storage station, having its battery removed for charging, being replaced by another BEV after receiving a charged battery and cleaned. FIG. 11(a) illustrates a BEV arriving at the charging/storage station where it is driven on a folded set pod wheel tracks. The top portion of the BEV is manually folded to prepare it for loading to parking storage container. FIG. 11(b) illustrates the unloading of the BEV's discharged battery and stored after receiving compressed air cleaning. At the right end of FIG. 11 the battery charging and replacement of a vehicle's battery is done. The exchange of batteries in FIG. 11(*b*) makes it possible for a customer to drop one BEV off and receive a maintained and charged BEV in a timely fashion rather than waiting for a battery to be charged for use. FIG. 11(*c*) illustrates the removal of the charged/stowed vehicle from charging/storage station. The top of the vehicle is manually unfolded to restore it to its driveable condition mode. The BEV is then driven away. While it is contemplated that the folding and unfolding is done manually, with the rapid development of robotics an embodiment using robotics is contemplated as well.

Figure 12:
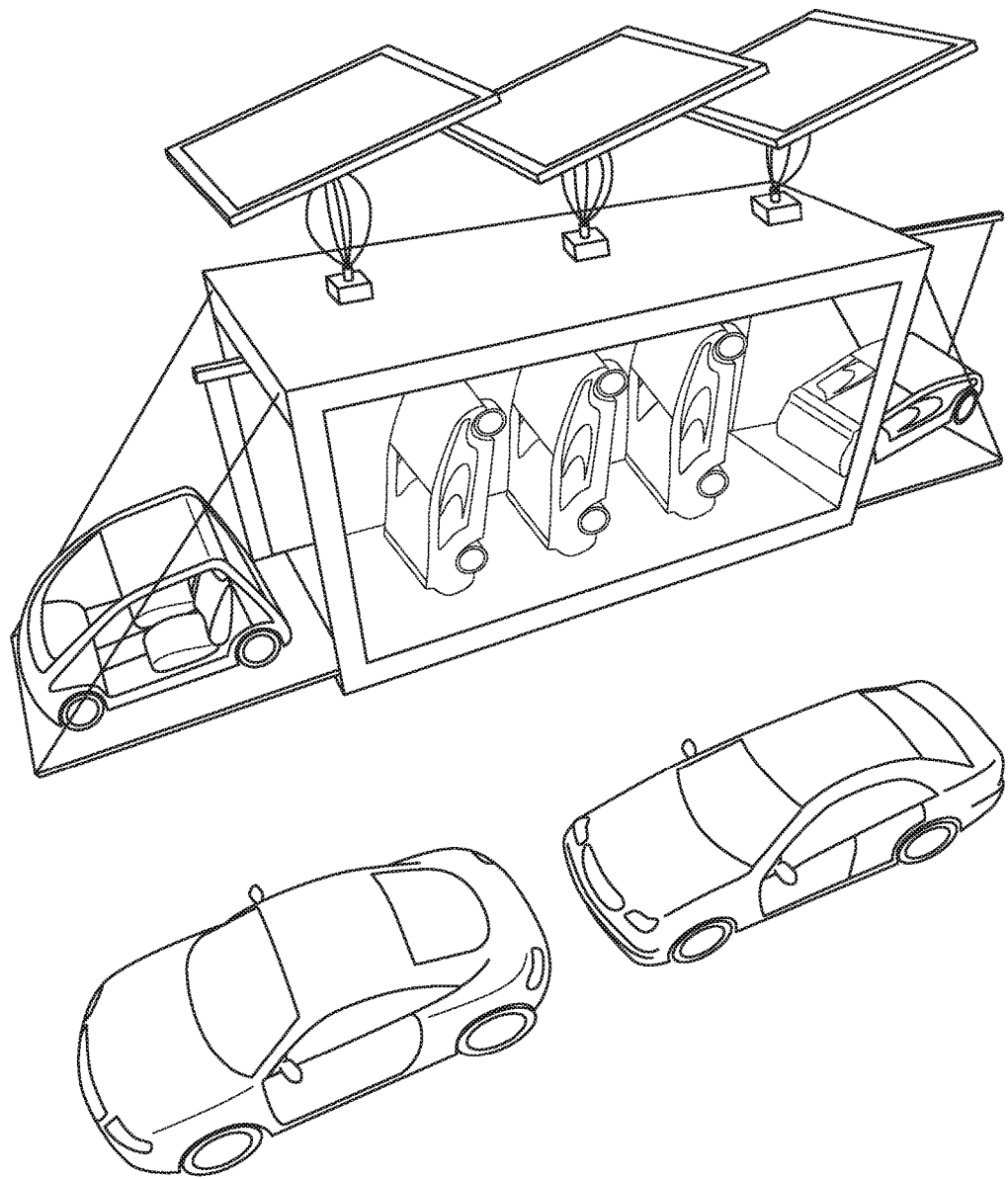
FIG. 12 illustrates the space saving feature of the BEV vehicle versus ICE vehicles.

FIG. 12 illustrates a comparison of the space required to store numerous BEV vehicles in a storage/charging station in comparison to store today's ICE vehicles. It is estimated that approximately 10 BEV vehicle can be stored in the space used by two BEV vehicles.

Figure 14:
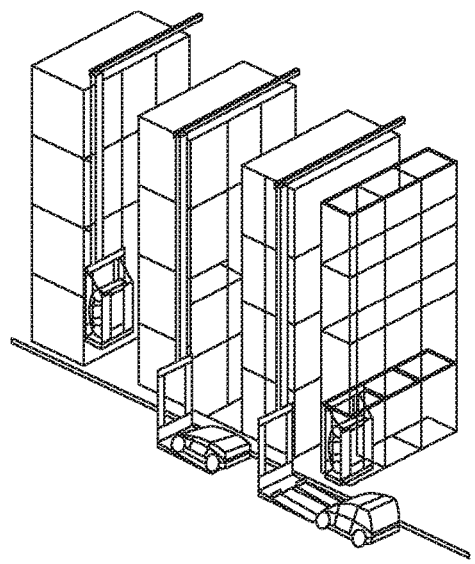
FIG. 14 illustrates a stacker crane system.
Figure 15:
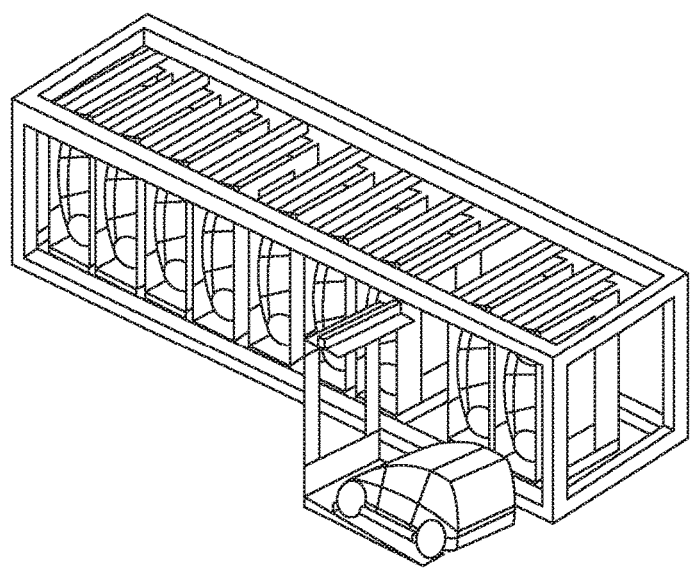
FIG. 15 illustrates a car-pod shipping container system.

As illustrated in FIG. 14, it is possible that several pods may be stacked vertically using a stacker crane system providing a further space efficiency by using vertical space to provide parking for the vehicles. FIG. 14 illustrates a car pod container system to provide a horizontal stacking system for parking or transportation of vehicles within a shipping pod.

Figure 16:
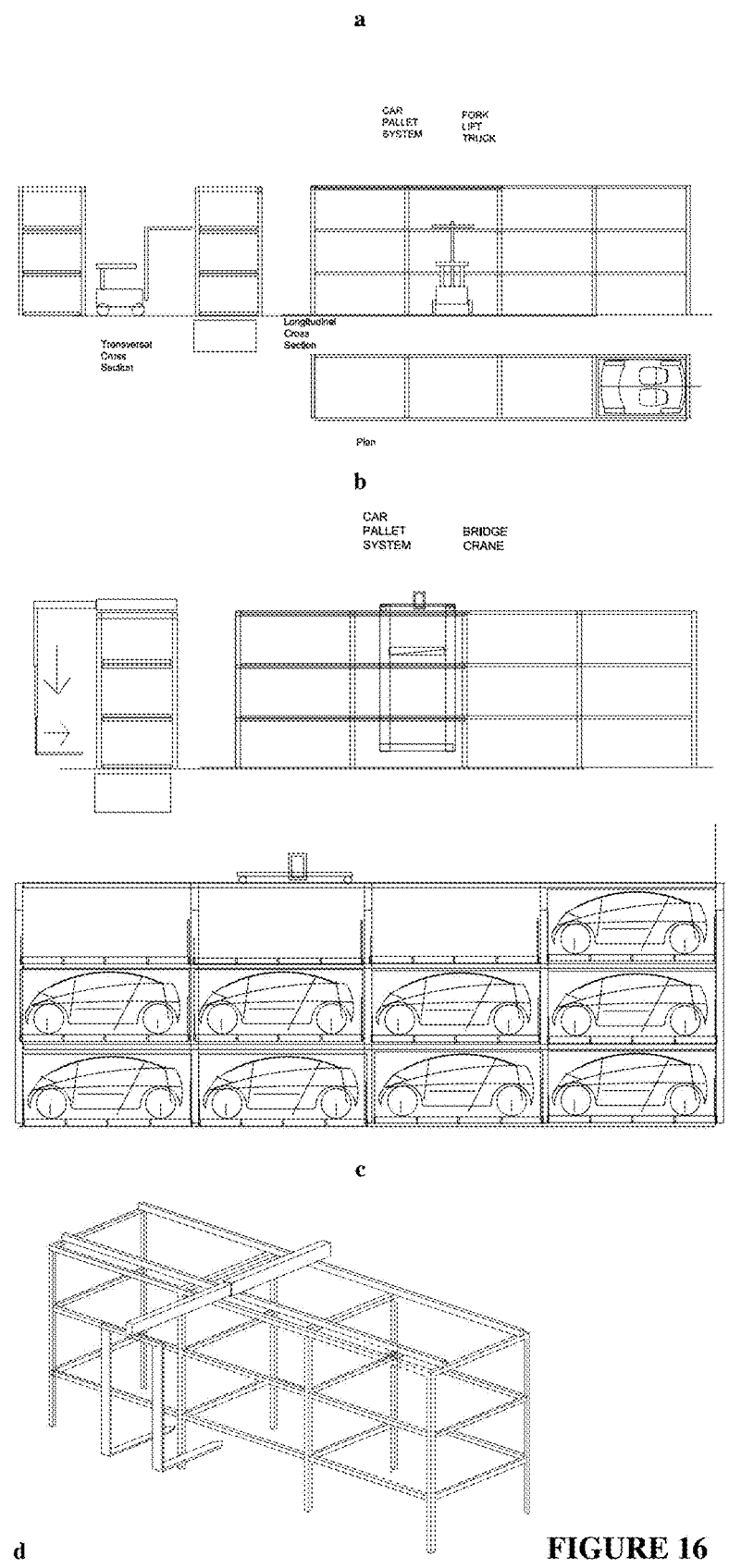
FIG. 16 illustrates a car pallet system with a fork lift and a bridge crane.

In addition to the pod configurations illustrated above the following figures illustrate some variations to illustrate the flexibility of the pod systems. FIGS. 16(*a-d*) illustrate further example of a car pod system and parking container alternatives including of a fork lift or bridge crane to store the BEV vehicle. In these arrangements the vehicle can be loaded for storage from any of the sides of the stacker container.

FIG. 17(*a*) illustrates several configurations starting with a recharging column, adding folding solar panels and adding the folding individual unit containers. FIGS. 17(*b-h*) illustrate how a multi-pod system operates with individual pods/containers going in and out to receive or deliver a vehicle. FIG. 17(*b*) illustrates a series of car pods at the edge of a street and vehicles traveling by. FIG. 17(*c*) illustrates a single pod moving out to the street to receive a vehicle. FIG. 17(*d*) illustrates the pod opening up by lowering the wheel tracks to receive the vehicle. FIG. 17(*e*) illustrates the vehicle beginning to mount the wheel tracks. FIG. 17(*f*) illustrates the vehicle competing it mounting of the wheel tracks. FIG. 17(*g*) illustrates the vehicle tracks folding the vehicle into the pod. FIG. 17(*h*) illustrates the folded pod with the vehicle being retracted to the off street position.

The delivery of a vehicle is essentially the reverse of the above steps. The delivery process begins with the pod containing the vehicle moving out to the street to deliver the vehicle. The pod opens and lowers the wheel tracks to containing the vehicle. The vehicle begins to demount the wheel tracks and backs off the wheel tracks. After the vehicle is completely off the tracks, the pod is returned to its storage position off the street. The vehicle is then free to go forward and operate as dictated by the driver.

Built for urban areas, the energy efficient cars are designed to alleviate traffic congestion and parking frustration. The proposed novel parking/charging system will reduce parking area by an order of magnitude. Ten (10) vehicles will occupy the same space as two traditional ones. By deploying this visionary concept, cities and states and other localities can become fully free themselves from oil dependence and utilize green technology for their transportation system. The proposed concept combines the portability of in-parking Urb&GO charging stations with distributive nature of the urban mobility network to develop innovative technologies with improved social benefit, energy savings, and economic and environmental advantages.

Within this concept there will be no need to perform costly and intrusive infrastructure modifications and eventually utility upgrade as wind and solar energy will be harvested to provide power to the vehicles, and existing parking lots and structures are used to deploy the self-sustainable and eco-friendly vehicles systems. The concept is a paradigm shift in how transportation is conceived today with significant vast improvement in the reliability of the whole mobility and transportation infrastructure. If this concept is developed to its full potential, it could be easily integrated in many urban areas with other renewable energy sources, allowing municipalities and other users to chase green power and meet carbon reduction goals. A similar concept can be also proposed for some special applications. For example, the single pod container with one unit can be deployed from a cargo airplane and the rotor located on the container can be used as a propulsion system to fly similarly to a helicopter, and can be used on the ground to produce power, similarly to a wind turbine. The power generated can be used to recharge the vehicle and also to transport the whole system from one location to another.

Military applications of this concept are also possible. As an example in a military application, where security is more easily available, a charging station could be powered by a clean power source such as a small nuclear power source. Such a charging station would make a military unit less dependent upon the availability of wind power and sunlight.

Figure 18:
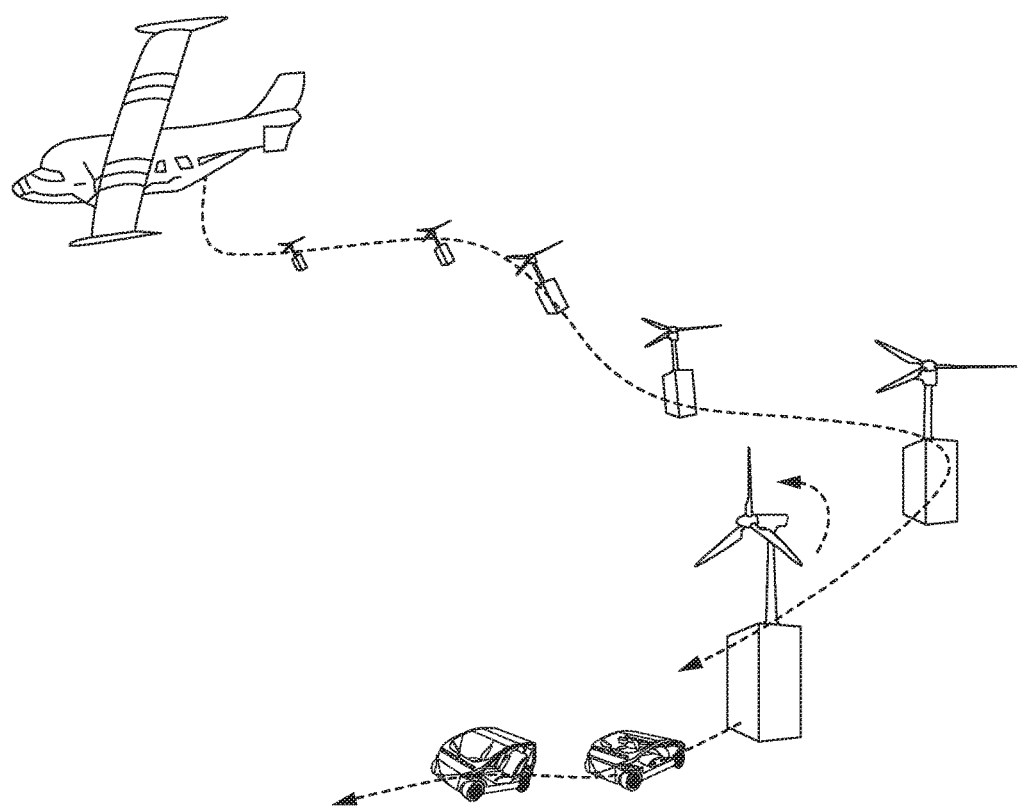
FIG. 18 illustrates an example of airplane deployment.
Figure 19:
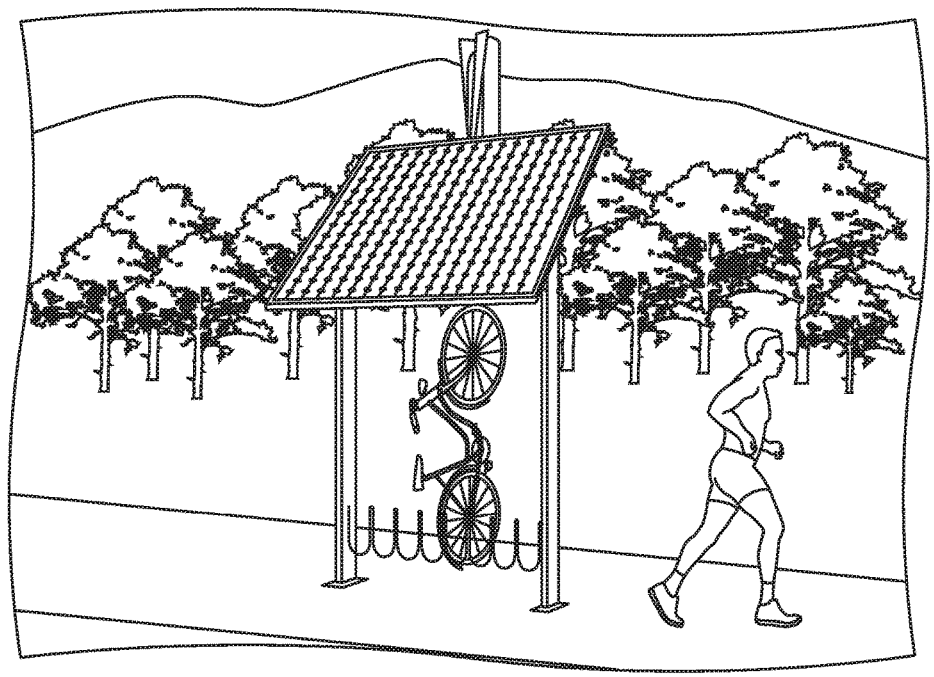
FIG. 19 illustrates an example of an electric bike pod system.

Specific elements of the Urb&GO technology include a BEV that is convertible between a driveable mode and a stowable mode where the height of the roof area of the vehicle is lowered when the vehicle is stowed. The stowable mode reduces the volume of the BEV allowing for the storage of more vehicles per cubic feet of storage or parking space. The infrastructure for the BEV includes various configurations for charging and storage facilities. The charging facilities may include wind turbines; solar polar of other renewable power. As illustrated in FIG. 18, a fleet of Urb&GO systems can be deployed from an airplane and each individual (or a plurality) of units can be deployed where the rotor is used in a rotorcraft mode (to propel the container and land the system on the ground) and in a wind turbine mode (once the container reached the ground). A single unit or a plurality of units can be deployed at once.

The use of Urb&GO vehicles to commute between downtown and suburbs can enlarge the area around the city where conventional cars are prohibited. This eliminates traffic and congestion in addition to keeping the city air quality high. In addition the "Park & Ride" idea can be used to allow people to use Urb&GO to commute to the city. Future concepts will deal with supply, distribution and delivery (of products and services) for residents of the city. The system can be utilized by drivers registered at the municipality or the city transportation administration that can issue credit card type of ID plus vehicle activation. Once the driver is recognized he/she will be billed for the car usage; fares should be reasonable, probably higher than public transportation systems but significantly lower than taxi fares, with a per-mileage payment. The vehicles can be administered by a municipal authority that will also be responsible for maintenance, insurance, and all needed parts or vehicles replacements. Privately owned vehicles option could be considered depending on local authorities; in this case owners must use or own Electric Vehicle Supply Equipment (EVSE) that may include the conductors, including ungrounded, grounded and equipment grounding conductors, the electric vehicle connectors, attachment plugs, and all other fittings, devices. Power outlets or apparatuses installed specifically for the purpose of delivering energy from the premises to the electric vehicle.

Specific Advantages of Current Design

The proposed concept addresses all urban mobility issues, from the vehicle, charging station, and space point of view. The Urb&GO Vehicle is part of an entire ecosystem, including recharging, parking, maintenance, utilization system. The concept solves several mobility problems simultaneously, the urban ones associated with parking and traffic congestion, and air and noise pollution. The Urb&GO Vehicle design, being performed with the essential design concept, includes the following advantages (see also benefit chart): i) minimum number of parts and components; ii) significantly lighter than any ICE vehicle; iii) less costly; iv) completely green and recharged with renewable sources; v) less area for parking and storage. The proposed concept takes also advantage of the charging stations that are already in existence or planned, therefore the in-parking Urb&GO stations can be deployed in locations where city planners and municipalities believe will be the most efficient and useful. Since the process of establishing moderate- to large-scale charging equipment at places of work and fleet locations is much more complicated than private residences, the Urb&GO concept simplifies this aspect significantly. The flexibility of the ecosystem includes the use an electric bike pod system as illustrated in FIG. 17.

Fuel Cells and their management system and other renewable technologies, not only wind and solar, along with a grid-tie connection can be included into the complete system, the powering container and the vehicle. In particular, for the case of fuel cells, the wind turbine can be connected to electrolyzers located into the containers, which pass the wind-generated electricity through water to split it into hydrogen and oxygen. The hydrogen can then be stored and later used to generate electricity from a fuel cell that can directly power the Urb&GO vehicle. As battery and PEM-Fuel Cell development advances, both technologies can be incorporated into the next generation of Urb&GO vehicles, as each offer unique advantages. The batteries have lower operating cost in term of energy used, however have long recharge times and low energy density limiting the vehicle range; however fuel cell can overcome these shortcomings, and in support of BEV an provide longer ranges and shorter recharge times.

Additional features of the ecosystem may include a security system when storing the vehicle. Such a security may include magnetic card and/or finger print type recognition and/or eye/face recognition for users. The containers may include an autonomous guide for moving from outside to inside said container and to move from the inside to the outside said container. Additionally the battery within a battery electric vehicle may be charged directly while in the vehicle using an induction process through the wheels rotors or other means to obviate the need for removing the battery from said vehicle.

Main Components of the Device: Infrastructure
Folding vehicle
Recharging container (single and stackable)
Renewable power source (wind, solar, bio-fuel, etc)
Power storage FIG. 20 illustrates the many benefits of the Urb&GO sustainable mobility ecosystem.

FIG. 20 includes data on energy, environmental, parking, economic and general factors and the benefits of the ecosystem.

Following long-standing patent law convention, the term "a" and "an" mean "one or more" when used in this application, including the claims. Even though embodiments have been described with a certain degree of particularity, it is evident that many alternatives, modifications, and variations will be apparent to those skilled in the art in light of the present disclosure. For example, a person of ordinary skill in the art may see, in the light of the present disclosure, other assembly arrangements, that may be used to accomplish the assembly of the wind/solar power systems in conjunction with the storage container for the vehicle, and or other logistic and vehicle folding mechanism, or unloading and charging of the batteries in conjunction with the proposed ecosystem. Another variant is that the batteries of the electric vehicles are recharged without being removed from the vehicle, directly as the vehicle slowly moves from one side to the other of the container. Autonomous guide operation is also considered in this concept. Accordingly, it is intended that all such alternatives, modifications, and variations which fall within the spirit and scope of the described embodiments be embraced by the defined claims.

LIST OF REFERENCES

[UN 2001] Urban Millennium (2001), Urbanization: Facts and figures, United Nations Centre for Human Settlements (Habitat), New York, http://www.un.org/ga/Istanbul=5/booklet4.pdf.

[Wired 2010] Wired (2010), Futuristic Pod Car Combines GM Vision, Segway Practicality http://www.wired.com/autopia/2010/03/general-motors-en-v/.

[Mitchell 2010] W. J. Mitchell, C. E. Borroni-Bird, and L. D. Burns (2010), Reinventing the Automobile: Personal Urban Mobility for the 21st Century, The MIT Press, Cambridge, Mass.

[UN 2010] World Population Prospects, The 2010 Revision, United Nations, Department of Economic and Social Affairs, Population Division, Population Estimates and Projections Section.

[Treehugger 2008] "Plug-in Hybrid Cars: Chart of CO2 Emissions Ranked by Power Source". TreeHugger. http://www.treehugger.com/files/2008/04/plug-in-hybrid-cars-co2-emissions-electricity-energy.php.

[DOE 2011] Updated State-level Greenhouse Gas Emission Coefficients for Electricity Generation http://www.eia.doe.gov/pub/oiaf/1605/cdrom/pdf/e-supdoc.pdf.

[EPM 2011] Electric Power Monthly, http://www.eia.gov/cneaf/electricity/epm/epm_sum.html
United_States_emission_standards#Electricity_generation "Less CO2". My Electric Car. http://www.myelectriccar.com.au/co2.html.

[Cortright 2010] J. Cortright (2010), New York City's Green Dividend, CEOs for Cities.

[US DOE 2010] www.fueleconomy.gov/feg/evtech.shtml.

[Energies 2011] M. Simonsen, H. J. Walnum, Energy Chain Analysis of Passenger Car Transport, Energies 2011, 4, 324-351.

[Delft 2010] B. Kampman, C. Leguijt, D. Bennink, L. Wielders, X. Rijkee, A. De Buck, W. Braat, Green Power for Electric Cars Development of policy recommendations to harvest the potential of electric vehicles Delft, CE Delft, January 2010.

[White House 2011] http://www.whitehouse.gov/the-press-office/2011/01/26/vice-president-biden-announces-plan-put-one-million-advanced-technology-. President Obama's Plan to Make the U.S. the First Country to Put 1 Million Advanced Technology Vehicles on the Road.

[OECD 2008] Climate Change: Meeting the Challenge to 2050, Policy Brief February 2008, Organization for Economic Co-Operation and Development.

[ARB 2009] Air Resource Board, State of California (2009) Summary of Staff's Preliminary Assessment of the Need for Revisions to the Zero Emission Vehicle Regulation, Attachment A: Status of ZEV Technology Commercialization (Technical Support Document), Nov. 25, 2009.

[EWEA 2008] Count on Wind Energy, EWEA The European Wind Energy Association, 2008.

[Anderman 2010] M. Anderman (2010) Feedback on ARB's Zero-Emission Vehicle Staff Technical Report of Nov. 25, 2009 including attachment A: Status of EV Technology Commercialization, Advanced Automotive Batteries, Jan. 6, 2010.

[MIT 2008] A. Bandivadekar, K. Bodek, L. Cheah, C. Evans, T. Groode, J. Heywood, E. Kasseris, M. Kromer, M. Weiss, (2008) On the Road in 2035: Reducing Transportation's Petroleum Consumption and GHG Emissions, MIT Laboratory for Energy and the Environment, Cambridge, Mass.

[BCG 2010] Boston Consulting Group (2010) Batteries for Electric Cars—Challenges, Opportunities, and the Outlook to 2020.

[EC 2009] Electrification Coalition (2009) Electrification Roadmap—Revolutionizing Transportation and Achieving Energy Security, November 2009.

[US EPA 2009] U.S. Environmental Protection Agency and the National Highway Traffic Safety Administration (2009) Draft Joint Technical Support Document—Proposed Rulemaking to Establish Light-Duty Vehicle Greenhouse Gas Emission Standards and Corporate Average Fuel Economy Standards, EPA-420-D-09-901, September 2009.

[F&S 2009a] Frost & Sullivan (2009a) Strategic Analysis of North American Passenger Electric Vehicle Market, N598-18, May 2009.

[F&S 2009b] Frost & Sullivan (2009b) World Hybrid Electric and Electric Vehicle Lithium-ion Battery Market, N6BF-27, September 2009.

[ARB 2007] F. Kalhammer, B. Kopf, D. Swan, V. Roan, M. Walsh (2007) Status and Prospects for Zero Emissions Vehicle Technology, Report of the ARB Independent Expert Panel, Prepared for State of California Air Resources Board, Apr. 13, 2007.

[NRC 2010] National Research Council (2010) Transitions to Alternative Transportation Technologies—Plug-in Hybrid Electric Vehicles.

[IEVS 2007] A. Pesaran, T. Markel, H. Tataria, D. Howell (2007) Battery Requirements for Plug-In Hybrid Electric Vehicles—Analysis and Rationale, Presented at the 23rd International Electric Vehicle Symposium (EVS-23) Anaheim, Calif., Dec. 2-5, 2007, NREL/CP-540-42240.

[ANL 2009] S. Plotkin, M. Singh (2009) Multi-Path Transportation Futures Study: Vehicle Characterization and Scenario Analyses, Energy Systems Division, Argonne National Laboratory, ANL/ESD/09-5, Jul. 22, 2009.

[NREL 2006] A. Simpson (2006) Cost-benefit analysis of plug-in hybrid electric vehicle technology, Presented at the 22nd International Battery, Hybrid and Fuel Cell Electric Vehicle Symposium and Exhibition (EVS-22), Yokohama, Japan, Oct. 23-28, 2006, NREL/CP-540-40485, November 2006.

[SANDIA 2008] D. Ton, C. Hanley, G. Peek, J. Boyes (2008) Solar Energy Grid Integration Systems—Energy Storage (SEGIS-ES), Sandia Report SAND2008-4247, July 2008.

[EPRI 2005] Batteries for Electric Drive Vehicle—Status 2005: Performance, Durability, and Cost of Advanced Batteries for Electric, Hybrid Electric, and Plug-In Hybrid Electric Vehicles. EPRI, Palo Alto, Calif.: 2005.

[The New York Times 2008] G. Collins, In Times Square, a Company's Name in (Wind- and Solar-+Powered) Lights. http://www.nytimes.com/2008/11/15/nyregion/15billboard.html.

We claim:

1. A transportation ecosystem comprising:
a plurality of stowable battery-electric vehicles each having a roof that extends in covering relation to an interior cabin; and
one or more networks of energy charging station and storage containers, wherein said charging station and storage containers are geographically distributed across communities and are directly powered from a renewable energy source;
wherein each of said electric vehicles is convertible between a horizontal drivable mode and a vertical stowable mode, wherein said roof of each of said vehicles is positioned at a first covering distance in relation to said interior cabin when in said drivable mode and at a second covering distance in relation to said interior cabin when in said stowable mode, said first covering distance being greater than said second covering distance; and
wherein at least some of the geographically distributed charging station and storage containers are configured to automatically convert a stowable battery-electric vehicle from the horizontal drivable mode to the vertical stowable mode.

2. The ecosystem of claim 1, wherein each roof of said vehicles is foldable to achieve said conversion between said first covering distance and said second covering distance.

3. The ecosystem of claim 2 wherein said reduced height reduces a storing volume of said vehicle by approximately one third.

4. The ecosystem of claim 1 wherein said vehicles are powered by one or more rechargeable batteries or fuel cell systems.

5. The ecosystem of claim 4 comprising:
an arrangement of systems and subsystems that alone and/or together are part of said system, including
one or more folding electric vehicles,
a distribution power unit system,
renewable resources units, and
power storage units,
all integrated within said container.

6. The ecosystem of claim 1 wherein said charging container comprises:
solar, wind and/or other renewable resources; and/or
fuel cell (PEM or other) sources.

7. The ecosystem of claim 6 wherein said charging container removes a discharged battery from a first battery electric vehicle, recharges said battery; stores said recharged batteries and installs a charged battery into said first vehicle or a second vehicle.

8. The ecosystem of claim 7 wherein said container can be deployed to a selected location by ground transportation or by air using a cargo airplane.

9. The ecosystem of claim 8 wherein when said container is deployed by an airplane, a rotor is used in a rotorcraft mode (to propel said container and land said system on the ground) and in a wind turbine mode (once the container reached the ground).

10. The ecosystem of claim 9 wherein a single container or a plurality of containers can be deployed at once.

11. The ecosystem of claim 8 wherein said deployment from an airplane or transported on the ground permits said system to be operative within a few hours rather than the days or weeks that connecting to a grid may require.

12. The ecosystem of claim 6 said wherein said power may be from a clean source such as a small nuclear power source for military application where security provisions permit.

13. The ecosystem of claim 1 wherein said battery electric vehicles comprise homologated and non-homologated vehicles.

14. The ecosystem of claim 1 wherein said system includes a security system to store said vehicle.

15. The ecosystem of claim 13 comprises:
an autonomous guide for moving from outside to inside said container and to move from inside to outside said container.

16. The ecosystem of claim 14 wherein said security system comprise:
magnetic card and/or finger print type recognition and/or eye/face recognition for users.

17. The ecosystem of claim 1 wherein said battery within said battery electric vehicle is charged directly in said vehicle using an induction process through said wheels rotors or other means to obviate the need for removing said batter from said vehicle.

18. A method of using a transportation ecosystem comprising the acts of:
using a plurality of stowable battery-electric vehicles each of which includes a roof extending in covering relation to an interior cabin;
having one or more networks of energy charging station and storage containers, wherein said charging station and storage containers are geographically distributed across communities;
powering said containers directly from a renewable energy source; and
automatically converting, by a geographically distributed charging station and storage container, at least one of said vehicles between a horizontal drivable mode and a vertical stowable mode by moving said roof of each of said vehicles from a first covering distance with respect to said interior cabin and a second covering distance with respect to said interior cabin, wherein said first covering distance is greater than said second covering distance.

19. The method of claim 18 wherein the converting step comprises folding said roof of said vehicle downward.

20. The method of claim 18 comprising the acts of powering said vehicles by one or more rechargeable batteries or fuel cells.

21. The ecosystem of claim 18 comprising the acts of:
arranging said systems and subsystems that alone and/or together are part of said system, including
one or more folding electric vehicles,
a distribution power unit system,
renewable resources units, the power storage units,
all integrated within said container.

22. The method of claim 18 comprising the acts of:
said charging container provides power to said vehicle using solar, wind and/or other renewable resources; and/or fuel cell (PEM or other) sources.

* * * * *